Sept. 3, 1957 W. CZARNOCKI 2,804,814
POWER ACTUATED IMPLEMENT HITCH FOR TRACTORS
Filed Nov. 17, 1953 4 Sheets-Sheet 1

INVENTOR.
WITOLD CZARNOCKI
BY
Carlson, Pitzner, Hubbard & Wolfe
ATTORNEYS.

Sept. 3, 1957 W. CZARNOCKI 2,804,814
POWER ACTUATED IMPLEMENT HITCH FOR TRACTORS
Filed Nov. 17, 1953 4 Sheets-Sheet 2

INVENTOR.
WITOLD CZARNOCKI
BY
Carlson, Pitzner, Hubbard & Wolfe
ATTORNEYS.

INVENTOR.
WITOLD CZARNOCKI
BY
Carlson, Pitzner, Hubbard & Wolfe
ATTORNEYS.

Sept. 3, 1957 W. CZARNOCKI 2,804,814
POWER ACTUATED IMPLEMENT HITCH FOR TRACTORS
Filed Nov. 17, 1953 4 Sheets-Sheet 4
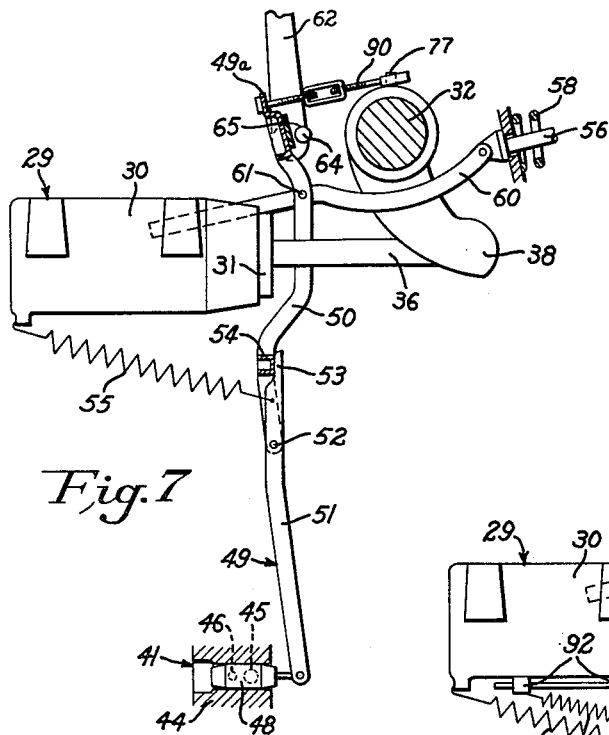
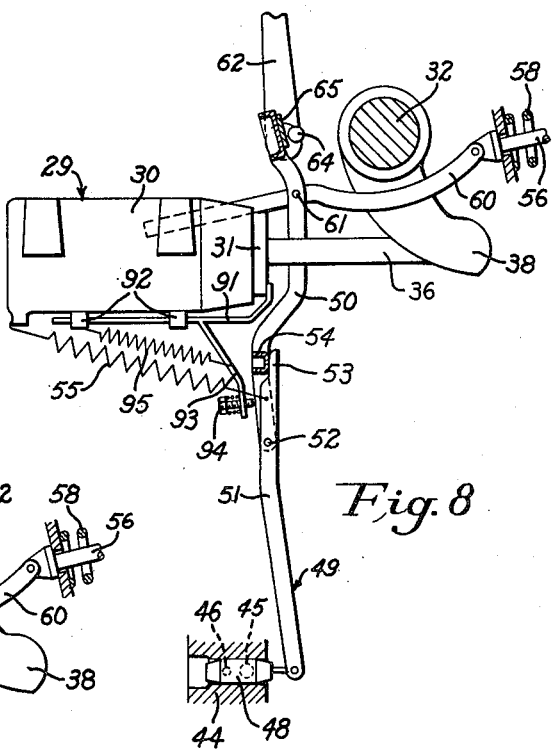
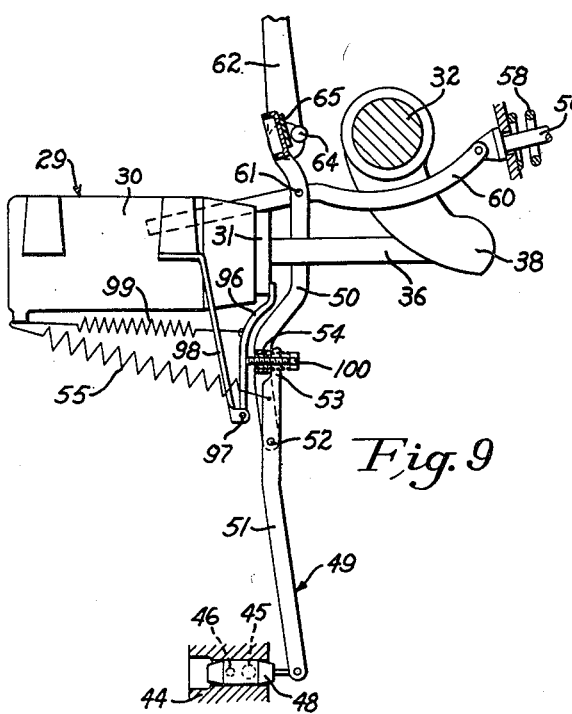
INVENTOR.
WITOLD CZARNOCKI
BY
Carlson, Pitzner, Hubbard & Wolfe
ATTORNEYS.

United States Patent Office 2,804,814
Patented Sept. 3, 1957

2,804,814

POWER ACTUATED IMPLEMENT HITCH FOR TRACTORS

Witold Czarnocki, Coventry, England, assignor to Massey-Harris-Ferguson (Sales) Limited, a British company Application November 17, 1953, Serial No. 392,661

Claims priority, application Great Britain November 20, 1952

11 Claims. (Cl. 97—46.07)

This invention relates to improvements in power actuated implement hitches for use on tractors or the like and, more particularly, has to do with transport cut-off means for automatically terminating the elevation of the hitch links when they have been lifted to a predetermined transport position.

The general aim of the invention is to improve upon prior hitches of the foregoing type by rendering the hitch more nearly immune from vibratory oscillations tending to result from inertia forces set up by a heavy implement carried in transport position. Such inertia forces arise, for example, from jarring of the tractor as it is driven over rough roads or fields, or from "springing" of the tractor on its tires as the implement is brought to rest.

By way of example, the invention contemplates improvements in power hitch controls of the type described in Ferguson Patent 2,118,180. Another object of the invention, therefore, is the provision of such oscillation immunity in a hitch which is also adapted for automatic draft control action, and automatic transport cut-off.

A further object is the realization of improved means for effecting automatic transport cut-off in such a hitch, not only rendering the hitch substantially immune to inertia, initiated oscillations, but also affording smoother stoppage of the hitch links as they are brought to rest in transport position.

Still another object is the provision of such a hitch and control in which the control element to be neutralized at cut-off is shifted in response to the movement of means connected with, but having less displacement and lower velocity than the hitch actuator so that the ratio of actuator movement to control element movement is lower than that heretofore provided.

It is an additional object to provide such a hitch mechanism in which the transport position, that is, the elevation of the draft links in transport, may be readily adjusted.

Other objects and advantages will become apparent as the following description proceeds, taken in conjunction with the accompanying drawings, in which.

Figures 2, 3:
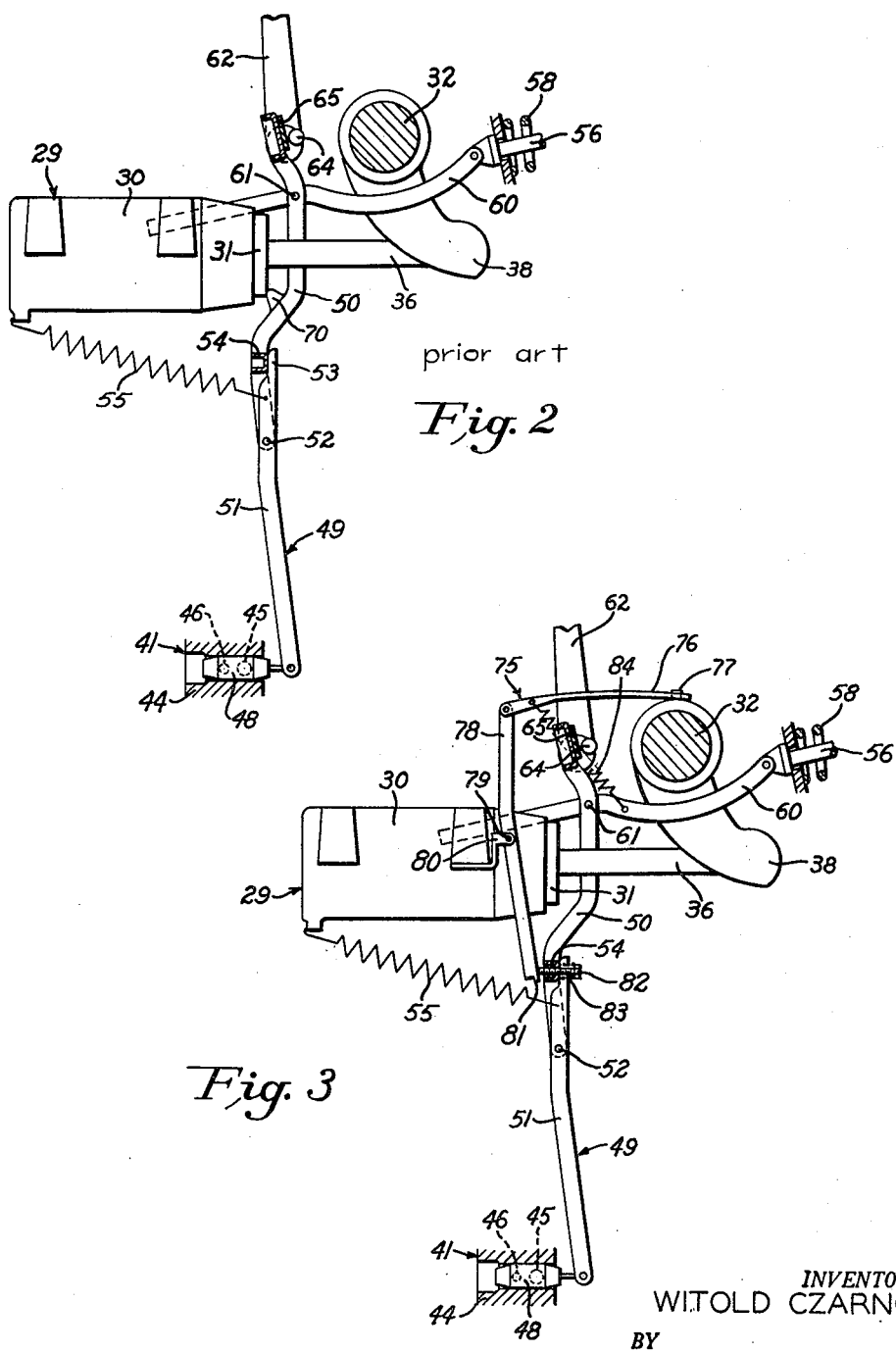
Fig. 2 is a fragmentary illustration of a portion of the prior hitch control parts shown in Fig. 1.
Fig. 3 is a fragmentary elevation of hitch control parts constituting a preferred embodiment of the present invention.

Figs. 7, 8, and 9 are similar to Fig. 3, illustrating second, third, and fourth embodiments of the invention, respectively.

While the invention has been illustrated and described in some detail with reference to particular embodiments thereof, there is no intention that it thus be limited to such detail. On the contrary, it is intended here to cover all alterations, modifications, and equivalents falling within the spirit and scope of the invention as defined by the appended claims.

In order to make clear one environment in which the invention finds particularly advantageous employment and to explain the improved action afforded by the practice of the invention, reference will first be made to a prior implement hitch and control system employed on the "Ferguson" tractor.

Figure 1:
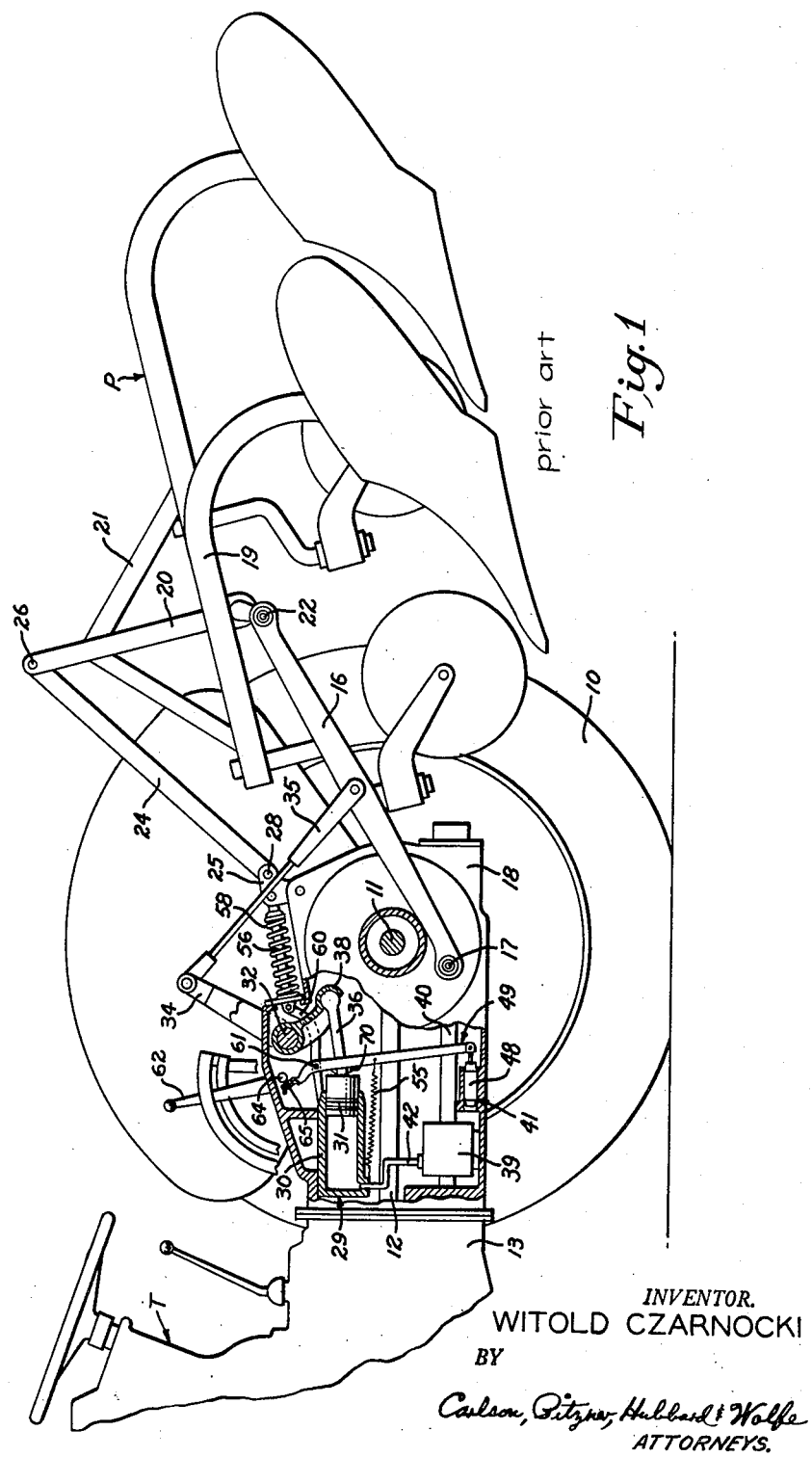
Figure 1 is a fragmentary side elevation of the rear portion of a tractor and an implement mounted thereon, illustrating the general organization of a prior implement hitch of the general type contemplated by the invention, the near rear wheel of the tractor being removed and the casing structure partially sectioned to expose the interior arrangement of parts.

Considering Figs. 1 and 2, the rear portion of a tractor T is shown which has a pair of pneumatically tired rear wheels 10 carried by rear axles 11. The latter are driven by an engine (not shown) through a propeller shaft 12 and a suitable transmission within the casing 13. For mounting various implements the tractor is equipped with a power actuated rear hitch including a pair of laterally spaced draft links 16 universally pivoted at 17 on opposite sides of a center differential housing 18. These draft links are preferably fashioned in the form of heavy steel bars and their pivots 17 are desirably located forwardly of and below the rear axles 11.

As an exemplary implement, a plow P including a base portion 19 and an upstanding A-frame 20, braced by rearwardly extending struts 21, is shown connected with the draft links 16. Such connection is made by means of pins 22 inserted through laterally apertured captive balls swiveled in the rear ends of the draft links, thus permitting the plow P to rock vertically about the axis defined by the pins. For draft control purposes, a top link 24 is pivotally connected between the upper portion of the A-frame 20 and a shackle 25 pivoted at the rear portion of the tractor. As here shown, a transverse pin 26 connects the link 24 to the A-frame, while a second pin 28 connects the forward end of the control link to the shackle.

Raising and lowering of the draft links 16 is accomplished by means of an actuator 29 here shown as a hydraulic cylinder 30 having a piston 31 slidable in it. A mechanical connection is made between the piston 31 and the draft links 16 such that upon the admission of pressure fluid to the cylinder and the rearward advancement of the piston, the draft links are swung upwardly. Correspondingly, upon venting of the cylinder 30, the weight of the draft links and the implement P shoves the piston 31 back into the cylinder. In this instance, such mechanical connection includes a rock shaft 32 journaled on the tractor and having rigid, radially extending lift arms 34 pivotally connected by means of drop links 35 to intermediate portions of the respective draft links 16. A connecting rod 36 having balled ends is socketed in the lower end of a rigid arm 38 extending from the rock shaft, and is similarly socketed in the piston 31. As pressure fluid is supplied to the cylinder 30 the piston 31 is shoved rearwardly to swing the rock shaft 32 counterclockwise and to cause the drop links 35 to elevate the draft links 16 and plow P.

A source of pressure fluid is here illustrated as a pump 39 disposed in the tractor casing, the latter also serving as a sump for suitable hydraulic fluid, such as oil. The pump is arranged to be continuously driven from the tractor engine by means of a power take-off shaft 40. The intake for the pump 39 is under the control of a valve 41 and its outlet is connected by a conduit 42 to the interior of the cylinder 30.

The control valve 41 comprises a housing 44 having an intake port 45 and an exhaust port 46 spaced longitudinally along a passageway in which a shiftable control element or plunger 48 is located. The plunger 48 is tapered at either end, but its central portion is of sufficient length to close both inlet and exhaust ports 45 and 46 when in the central or "neutral" position illustrated. Shifting of the plunger to the left from the position illustrated opens the inlet or suction port 45 so that fluid is admitted to the pump 39 and supplied under pressure to the cylinder 30, while shifting the plunger to the right opens the exhaust port 46 to vent fluid from the cylinder. The exhaust port is connected with the interior of the cylinder 30 by a conduit not visible in the drawings.

For controlling the position of the plunger 48, a floating lever 49 is vertically disposed within the casing and pivotally connected at its lower end with the plunger. The lever 49 is made up of upper and lower sections 50, 51 which are pivotally joined as at 52, the lower section having an upstanding ear 53 which is urged against a cross member 54 on the upper portion by a tension spring 55. Under normal conditions the sections form a rigid lever, although the "knuckle" joint may break in one direction, under excessive forces. The spring 55, in addition, urges or biases the lever to push the plunger 48 to the left about either of two fulcrums at its upper end.

For providing automatic draft control, a control plunger 56 is mounted on the tractor for shifting movement in a fore and aft direction and pivoted to the shackle 25 to be moved by draft forces on the plow P against the opposing bias of a coaxial control spring 58. The control plunger 56 is linked with the upper portion of the floating lever 49 by a member or thrust link 60 pivotally connected with the floating lever at 61. Additionally, the floating lever is controlled in position by a manually adjusted quadrant lever 62 journaled on the tractor and having an eccentric pin 64 engageable with a pad 65.

The plow P may be lowered by shoving the quadrant lever 62 forwardly so that the eccentric pin 64 strikes the pad 65 and swings the lever 49 about the pivot 61 to move the plunger 48 to the right. The exhaust ports 46 are thus opened and the draft links 16 and plow P drop under the influence of their own weight. As the tractor advances with the plow in engagement with the ground rearward draft forces tend to rock the plow about its pivot pins 22 and to exert a forward thrust on the link 24. This shifts the control plunger 56 and link 60 forwardly against the force of the spring 58, permitting the spring 55 to rock the floating lever 49 about the eccentric 64 as a fulcrum to restore the plunger 48 to neutral. Any variations in draft forces thus cause corrective shifting of the plunger 48 and the supply or exhaust of fluid to or from the cylinder 30. The draft links 16 are thus automatically raised or lowered to maintain draft forces substantially constant at a preselected value determined by the setting of the quadrant lever and its eccentric 64.

In order to raise the plow P to transport position, the quadrant lever is rocked upwardly and rearwardly, thus shifting the eccentric 64 clear of the floating lever 49. As a result, the tension spring 55 urges the lever 49 to swing in a clockwise direction about the pivot 61, thus shifting the plunger to the left, opening the supply ports 45, and causing pressure fluid to be pumped to the cylinder 30. For automatically terminating the lifting of the draft links and plow when they have reached a predetermined transport position, a projection 70 is formed on the lever 49 to be engaged by the skirt of the piston 31 as it emerges from the cylinder 30. This serves to rock the lever 49 counterclockwise about the pivot 61 against the bias of the spring 55 to thereby return the plunger 48 to neutral. The ports 45 and 46 being thus blocked, fluid is trapped in the cylinder 30 to hold the plow P in transport position. It will be apparent that by this arrangement transport shut-off occurs by direct action of the piston skirt upon the floating lever 49.

Under certain conditions it is possible that vibratory oscillations of the implement may result as the tractor is driven over bumpy surfaces with the implement in transport position. That is, there may be some up-and-down movement of the draft links 16 with the plunger 48 being shifted back and forth from its neutral position to supply or vent fluid to or from the cylinder 30. This oscillation has been observed in some instances as seemingly self-sustained by energy taken from the hydraulic system, and is more likely to occur when a relatively heavy implement is being transported on the hitch.

Such sustained oscillation of the implement is objectionable because it may impair steering accuracy as the tractor is being driven, cause discomfort to the driver, cause undue wear or loosening of parts, or create excessive hydraulic pressures in the system resulting in the release of a safety valve (not shown).

Careful study and experimentation have revealed the reasons for such oscillatory vibrations and the present invention is directed primarily to the substantial elimination of that effect.

It has been found that because the tractor itself constitutes a mass supported by springs in the form of pneumatic tires, certain vibrations of the tractor body may occur if a heavy implement is brought to an abrupt stop in transport position. Similar movements may be occasioned by the tractor being driven over rough surfaces. Since the implement is supported on the pivoted draft links 16, it has a certain freedom to articulate with respect to the tractor under the influence of inertia forces. As a first cause of these oscillations, therefore, it is possible for the implement to "bounce" up and down relative to the tractor, thus rocking the draft links 16 and, through their mechanical connection to the piston 31, compressing, to some degree, the fluid trapped in the cylinder 30. While the fluid compression and the resulting displacement of the piston 31 is very small, it nevertheless results in the piston skirt rocking the lever 49 about the pivot 61 and consequently shifting the control plunger 48 from its neutral position. Accordingly, fluid may be supplied to or vented from the cylinder 30 as a result of these inertia forces. Under certain frequency and phase relations the oscillations may become self-sustained, particularly in view of the fact that a slight movement of the piston 31 results in an amplified movement of the plunger 48. In the arrangement illustrated by Fig. 2, for example, the ratio of plunger movement to piston movement is in the order of 8:1, thus constituting a relatively high degree of amplification.

Such vibratory oscillations may occur for another reason, namely, the rocking of the implement about its pivot connections at 22 and the consequent slight shifting of the control plunger 56 against the bias of the spring 58. For example, if the implement's weight is distributed in a certain manner, jarring of the tractor may cause it to swing about the pivot pins 22 so that it exerts thrust on the shackle 25 and shifts the pivot 61 in a fore and aft direction. When this occurs the lever 49 rocks about the piston skirt as a fulcrum, thus shifting the valve plunger 48. Since the projection 70 engaging the piston skirt is relatively close to the pivot 61 and the plunger 48 relatively remote from it, even a slight shifting of the plunger 56 and link 60 due to rocking of the implement results in a perceptible displacement of the plunger 48. When the frequency and phase of the exciting inertia forces are in certain relations, the opening and closing of the valve 41 may result in sustained vibrations.

It has been discovered that the primary source of these sustained oscillations lies in the amplification of movements from either the piston skirt or the link 60 to the plunger 48. That is, the ratios of movements between the plunger 48 and either the piston skirt or the pivot 61 are undesirably high.

In accordance with the present invention, transport cut-off means are provided to make the ratio of plunger movement to piston movement relatively low as transport cut-off occurs and when the hitch is held in its transport position. Preferably, this is accomplished, in the practice of the invention, in one or both of two ways: (1) providing for the floating lever to be moved not by the piston itself for transport cut-off, but by a part of the mechanism which moves in sympathy with the piston although through a smaller total distance, and (2) by arranging for a linkage so moved to engage the floating lever at a point reducing the lever's distance amplification.

Referring now more especially to Figs. 3, 4, 5, and 6, an improved hitch and control forming a preferred embodiment of the invention are there shown. In this instance, a linkage 75 is connected to be moved with the rock shaft 32 and to engage the floating lever 49 at a point considerably below the skirt of the piston 31. Preferably such linkage comprises a top stirrup link 76 which is notched at its aft end 76a to bear againt a finger or pin 77 set radially into the upper side of the rock shaft 32. The link 76 has bifurcated arms extending forwardly for pivotal connection with the respective upper ends of a U-shaped or V-shaped cut-off lever 78 which is fulcrumed on pivot pins 79 inserted through brackets 80 bolted to the cylinder 30. The first order lever 78 straddles the cylinder and extends considerably below the piston 31, so that a striker pad 81 on its lower end is adapted to engage an abutment on the lever 49 which is spaced at a considerable distance from the pivot 61. To enable adjustments in the transport position, i. e., the elevated position in which the draft links are automatically stopped, such abutment may comprise a stop screw 82 threaded into a tapped cross portion 54 carried by the lever 49. Adjustments of the screw 82 permit variations in the transport position of the draft links 16 and the implement on them. A compression spring 83 may be employed on the screw 82 to hold it in selected settings.

The linkage connection to the rock shaft 32 preferably is a one-way or lost-motion connection. The pin 77 is in abutting relation with the notch 76a in the link 76. The latter is urged against the pin 77 by a tension spring 84 connected between the thrust link 60 and the forward portion of the link 76. Though not rigidly connected with the rock shaft 32, the link 76 thus follows the fore and aft movements of the pin 77 and is not affected by vertical components of the pin's movement as the rock shaft swings.

The remaining parts and organization of the present hitch may be substantially the same as those previously described in connection with Figs. 1 and 2. The operation of the present hitch in stopping and holding the draft links 16 and a heavy implement in transport position is, however, greatly enhanced.

Figures 4, 5, 6:
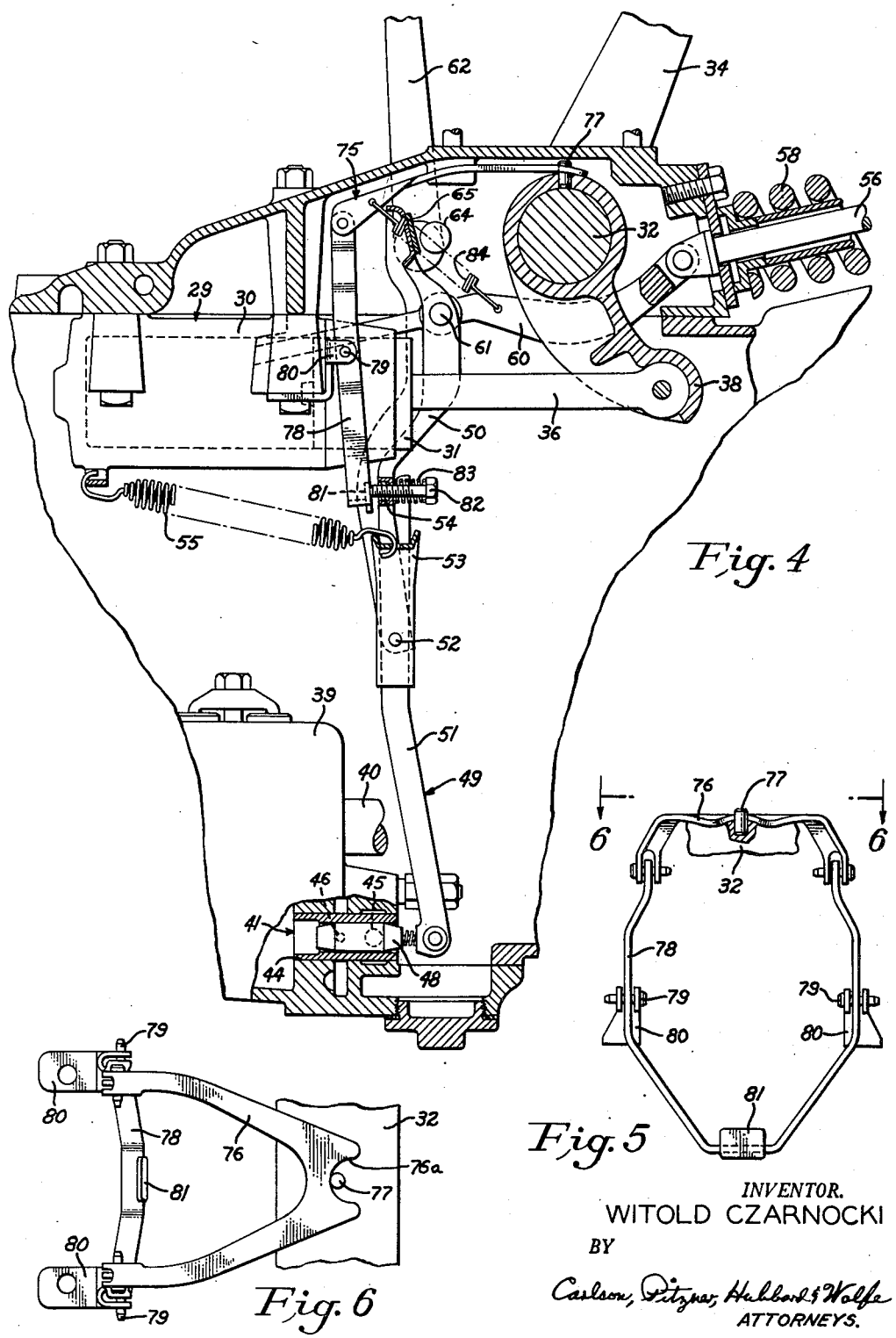
Fig. 4 is similar to Fig. 3, enlarged to show in more detail the organization of the preferred embodiment.
Fig. 5 is a detail view of a cut-off lever employed in the hitch arrangement shown in Fig. 4.
Fig. 6 is a detail view taken substantially along the line 6—6 in Fig. 5 and illustrating a link connected between the rock shaft of the hitch and the lever shown in Fig. 5.

When the draft links 16 are lowered to place the implement in working position, the rock shaft 32 is swung clockwise from the position shown in Figs. 3 and 4. Consequently, the pin 77 is moved rearwardly and downwardly and may retreat from engagement with the link 76. However, the latter rides in sliding relation on the top of the rock shaft 32 and is pulled rearwardly by the spring 84, so that the lever 78 is rocked clockwise (Fig. 4) and the striker 81 withdrawn from the abutment screw 82. The hitch thus operates in the manner described above with reference to Figs. 1 and 2, providing automatic draft control action under the combined influence of the quadrant lever 62 and the control plunger 56 on the floating lever.

When the quadrant lever 62 is shoved rearwardly to raise the draft links to transport position, the piston 31 emerges from the cylinder 30 to rock the rock shaft 32 counterclockwise. The piston skirt in this instance does not strike the floating lever 49. Instead, transport cut-off is achieved by the pin 77 engaging the link 76 and shoving the latter forwardly. This rocks the cut-off lever 78 counterclockwise about its fulcrums at 79 so that the striker pad 81 engages the abutment 82 at a predetermined position of the rock shaft 32 which is determined by the setting of the abutment screw 82. As a result, the floating lever 49 is rocked counterclockwise about its pivot at 61 and the valve plunger 48 moved to the right and placed in neutral position.

Because the horizontal displacement of the pin 77 is relatively small compared to the corresponding rearward movement of the piston 31, the pad 81 is moved rearwardly into engagement with the abutment 82 at a much lower velocity than that with which the piston skirt engages the lever 49 in the prior arrangement shown by Figs. 1 and 2. Secondly, the ratio of the distances between (1) the pivot 61 and the plunger 48 and (2) the pivot 61 and the abutment 82 in Fig. 3 is much less than the ratio of distances between (1) the pivot 61 and the plunger 48 and (2) the pivot 61 and the projection 70 in Fig. 2. Thus, there is less distance amplification afforded by the lever 49 in the hitch illustrated by Figs. 3 and 4. As a result, the valve plunger 48 is moved much more slowly to its neutral position in the arrangement provided by the present invention. The supplying of pressure fluid to the cylinder 30 is therefore cut off slowly and smoothly, bringing the draft links and implement to rest in transport position with much less deceleration.

With the implement held in transport position, inertia forces tending to compress fluid in the cylinder 30 and resulting in slight movements of the piston 31 result in much smaller corresponding horizontal movements of the pin 77 as the rock shaft is swung slightly in sympathy with the piston. As a result the link 76 and the striker pad 81 are moved in sympathy with the piston 31 but at a greatly reduced ratio. And such movements as do occur for the striker pad 81 are effective in producing relatively small displacements of the control plunger 48 at the lower end of the floating lever 49 due to the reduced distance amplification. The presently illustrated and described hitch, therefore, permits the control plunger to be moved only a relatively small amount for displacements of the piston 31. It has been found that in the arrangement illustrated, the ratio of plunger movement to piston movement may be as low as 2:1, as contrasted with the ratio of approximately 8:1 in the prior arrangment. Whatever degree of oil compression and piston displacement may occur as a result of the implement "bouncing" relative to the tractor under the influence of inertia forces, does not result on the opening and closing of the valve ports to a degree sufficient to sustain the oscillations described above.

With regard to oscillations arising from "rocking" of the implement under inertia effects, the present arrangement provides a considerably reduced distance amplification when the lever 49 is rocked about the pad 81 as a fulcrum in response to shifting of the thrust link 60. Consequently, the valve plunger 48 is shifted much less than in the arrangement previously described and oscillations are not sustained.

Turning now to Fig. 7, a second embodiment of the present invention is there shown, corresponding parts being identified by the same reference numerals employed in those figures previously described. In this arrangement, the piston 31 is also free to move throughout its entire range of travel without contacting the floating lever 49. For providing transport cut-off action, connection is made between a part of the mechanical connection between the actuator 29 and the draft links 16 and the floating lever 49 by means for engaging and rocking the latter with a low ratio of movement between the plunger 48 and the piston 31. In the present embodiment, a direct connection is made between the rock shaft 32 and an upper extension 49a of the floating lever 49 so that upon counterclockwise rocking of the rock shaft, the lever 49 is swung counterclockwise about the pivot 61 to neutralize the valve plunger 48. Preferably, such connection is made by means of an adjustable link 90, here shown as a turn buckle connected at its forward end with the extension 49a and at its aft end with the pin 77 set into the rock shaft 32. Again, the aft end of the link 90 is notched to have abutting relation with the pin 77 and the spring 55 serves to urge the link into abutment with the pin when the eccentric 64 is moved rearwardly. The pin 77 may thus swing free of the link when the rock shaft 32 swings clockwise to lower the draft links and implement. When this occurs, the aft end of the link 90 either rides upon and is supported by the cylindrical surface of the rock shaft or is held by the eccentric 64 engaging the pad 65.

The operation of this second embodiment is substantially similar to that described in connection with the first embodiment. As the piston 31 emerges from the cylinder 30 to place the implement in transport position, the pin 77 is moved forwardly and shoves the link 90 to rock the lever 49 counterclockwise about its pivot at 61 so that the plunger 48 is neutralized. However, as explained above, the fore and aft translation of the pin 77 is considerably less than the corresponding translation of the piston 31 so that cut-off occurs much more smoothly. Secondly, the distance amplification afforded by the lever 49 may be made relatively low since the ratio of the distances from (1) the pivot 61 to the lower end of the lever 49 and (2) the pivot 61 to the extension 49a, may be made relatively low by making the extension 49a relatively long. While the drawings show the distance amplification of the lever 49 to be about the same in Figs. 2 and 7, it is within the purview of the invention to make the above-mentioned ratio of distances considerably lower than in the arrangement illustrated in Figs. 1 and 2 where the piston skirt strikes the abutment 70 which is located fairly close the the pivot 61.

The second embodiment illustrated by Fig. 7 is immune to sustained oscillation due to inertia forces on the implement for the same reasons previously described. That is, any compression of fluid in the cylinder 30 and resultant displacement of the piston 31 results in a still smaller, relatively minute displacement of the pin 77 in a fore and aft direction. As a result, the lever 49 is not rocked appreciably and the valve plunger 48 is not appreciably displaced due to the relatively low distance amplification factor afforded by the lever 49. Neither the intake nor exhaust ports of the valve are open and sustained oscillations are not created.

Referring next to the third embodiment of the invention shown in Fig. 8, the general arrangement of the hitch mechanism is as previously described. However, in this instance, transport cut-off action is achieved by means of the link moved in response to the movement of the piston 31, but engageable with the lever 49 at a point lower than the piston to provide lower distance amplification in acting on the valve plunger 48. As here shown, a bar 91 is slidably disposed in brackets 92 fastened to the underside of the cylinder 30 and has its aft end turned upwardly to be engaged by the skirt of the piston 31 as the latter emerges from the cylinder. A downturned strap 93 is rigidly carried by the bar 91 and provided with an adjustable abutment screw 94 adapted to engage the lever 49. The bar 91 and strap 93 are biased in a forward direction by means of a tension spring 95 connected between the strap and one of the brackets 92. The abutment screw 94 is thus made to follow the movements of the piston 31 as the latter elevates the hitch links and implement to transport position whereupon the abutment screw 94 engages the lever 49 and rocks it counterclockwise about the pivot 61 to neutralize the valve plunger 48. Because the abutment screw 94 strikes the lever 49 at a greater distance from the pivot 61 than the location of the piston skirt, the distance amplification of the lever 49 is considerably lower than that in the prior arrangement described. Thus, the valve plunger is neutralized more slowly and the implement brought to a smooth stop in transport position. Additionally, any movements of the piston 31 due to compression of fluid in the cylinder 30 result in corresponding movements of the abutment 94. But since the latter acts at a greater distance from the pivot 61, the ratio of plunger movement to piston movement is considerably less than in the prior arrangement described. The valve ports are not opened enough to sustain such undesired oscillations. The same holds true in the case of the implement rocking about its pivot connection with the draft links resulting in some fore and aft displacement of the pivot 61. This may swing the lever 49 about the abutment screw 94 as a fulcrum, but the low distance amplification provided by the lever does not produce enough movement of the plunger 48 to sustain the oscillations.

Referring now to Fig. 9, a fourth embodiment of the invention is there illustrated. It is generally similar to that shown in Fig. 8 except that a lever connection is provided between the piston skirt and the following lever 49. In this instance a lever 96 is pivoted at 97 to a bracket 98 bolted to the cylinder 30 and extending therebeneath. The lever 96 extends upwardly for engagement with the skirt of the piston 31 and is biased against the piston or the cylinder 30 by means of a tension spring 99. The immunity to oscillations previously described and smoother stoppage of the implement in transport position is achieved in this arrangement by virtue of the fact that the midportion of the lever 96, which engages an adjustable abutment screw 100 on the lever 49, moves a considerably less distance than the corresponding movement of the piston itself. Additionally, the cut-off actuation is applied to the lever 49 at a point considerably below the pivot 61 so that the amplification of the lever 49 is also reduced from that afforded by the prior arrangement described with reference to Figs. 1 and 2. It will be apparent, therefore, that as the piston 31 is moved slightly when oil is compressed by inertia forces set up on the implement, the midportion of the lever 96 moves only a slight amount relative thereto. This swings the lever 49 counterclockwise about the pivot 61, but because the amplification of the lever is also reduced, the plunger 48 is not moved sufficiently to open the valve ports to the degree necessary to sustain the undesired oscillations previously described.

I claim as follows:

1. In a hitch having draft links pivoted on a tractor for receiving an implement, a hydraulic piston and cylinder, means including a rock shaft for raising the draft links upon the supplying of pressure fluid to the cylinder, a hydraulic pump, and a control valve shiftable in opposite directions from a neutral position for supplying pressure fluid from said pump to said cylinder or venting fluid from said cylinder; the combination of a draft control member shiftable in response to draft forces on an implement when received by said draft links; a quadrant lever providing a shiftable fulcrum; a floating lever connected at one end to said valve, engageable at its opposite end with said quadrant lever fulcrum, and pivoted at its intermediate portion with said draft control member; a cut-off lever pivotally mounted at its midportion, a link connected to said rock shaft to rock said cut-off lever as said piston moves; said cut-off lever being engageable with said floating lever to neutralize said valve when the piston and rockshaft reach a predetermined transport position, said cut-off lever being engageable with said floating lever at a point between said control valve and said draft control member.

2. The combination set forth in claim 1, further characterized in that an abutment is provided on the floating lever to be engaged by said cut-off lever, said abutment being adjustable in the direction of relative movement between the levers to thereby permit variations in the transport positions of the piston, rockshaft, and draft links.

3. In a power actuated hitch for use on a tractor and having draft links pivoted to the tractor for mounting an implement, a rockshaft journaled on the tractor, means operatively connecting the rockshaft and draft links, a source of pressure fluid, and a hydraulic piston translatable in a cylinder and operatively connected with the rockshaft; a control system comprising, in combination, a valve shiftable in opposite directions from a neutral position for supplying pressure fluid to or venting fluid from the cylinder, a control member shiftable in response to draft forces on an implement mounted on said draft links, a floating lever, means pivotally connecting said floating lever at spaced points with said valve and control member, respectively, means biasing said lever to move said valve to its fluid supplying position, and means including a first order lever connected at one end with the rockshaft and engageable at its other end with a point intermediate said spaced points on said floating lever for shifting said valve to its neutral position when the rockshaft reaches a predetermined position.

4. In a power-elevatable implement hitch having vertically swingable draft links, a hydraulic piston, and means including a rockshaft mechanically connecting said piston and draft links, the combination with a valve means shiftable in opposite directions from a neutral position and a floating lever connected to position said valve means, of a radial finger on said rockshaft, and means providing a one-way connection with said finger and operative on said lever to shift said valve means to neutral when the draft links are elevated to a predetermined transport position.

5. In an implement hitch for a tractor including a pair of draft links pivoted to the tractor for mounting an implement, a source of pressure fluid, a hydraulic cylinder and a piston translatable therein, means connecting said piston to raise and lower said draft links, a control valve having a plunger shiftable in opposite directions from a neutral position to supply pressure fluid to or vent fluid from said cylinder, and a control member shiftable in response to draft forces on an implement mounted on said draft links; the combination of a substantially vertical floating lever, means pivotally connecting the lower end of said lever to said valve plunger and the upper portion to said control member, and means movable in sympathy with said piston for engaging said floating lever and rocking it about its pivot with said control member to neutralize said valve plunger when the draft links are elevated to a predetermined transport position, said last named means engaging said floating lever at a point closer to said valve plunger and farther from said control member pivot than the piston.

6. In a power actuated implement hitch for mounting an implement on a tractor, the combination of an actuator; means mechanically connecting said actuator to elevate the implement hitch and having a part which moves through less total distance and at a lower velocity than said actuator; a first manually shiftable member; a second member shiftable in response to draft forces on the implement; a control element shiftable in opposite directions from a neutral position to control said actuator; a floating lever engageable with said first member, pivotally connected with said second member, and connected with said element at points spaced along its length in the order named; means biasing said floating lever to shift said element to its actuator-energizing position, and means connected to be moved by said lower velocity part, said means being engageable with said floating lever between said second member and control element for rocking the control lever against the biasing means to neutralize said element when the actuator reaches a predetermined transport position.

7. In a power-elevatable implement hitch having vertically swingable draft links, a hydraulic actuator, means including a rockshaft mechanically connecting said piston and draft links, the combination with valve means shiftable in opposite directions from a neutral position, a floating lever connected to position said valve means, and a control member shiftable in response to draft forces on an implement carried by the draft links, of a pin projecting radially from said rockshaft, a link, spring means biasing said link toward abutment with said pin to provide a lost motion connection, and means moved by said link in response to movement of said pin to rock said lever and shift said valve means to neutral when the draft links are raised to a predetermined transport position.

8. The combination set forth in claim 2 further characterized in that the connection between said link and rockshaft provides a lost motion connection comprising a radial projection on said rockshaft and yieldable spring means biasing said link toward abutting engagement with said projection.

9. The combination set forth in claim 4 wherein the last named means includes an adjustable link connected to said floating lever whereby said predetermined position may be selectively varied.

10. The combination set forth in claim 5 further characterized in that said last named means comprises a cut-off lever pivotally mounted at one end and engaged at its opposite end with the skirt of said piston to be rocked upon translation of the latter.

11. The combination, as set forth in claim 5, wherein said last named means comprises a slide carried for reciprocating movement parallel to said piston and having a projection engaging the piston for causing said slide to move in sympathy therewith.

References Cited in the file of this patent

UNITED STATES PATENTS

| | | |
|---|---|---|
| 858,207 | Patten | June 25, 1907 |
| 2,511,393 | Worthington | June 13, 1950 |
| 2,560,914 | Almeras | July 17, 1951 |
| 2,632,628 | Bunting | Mar. 24, 1953 |
| 2,715,863 | Bunting | Aug. 23, 1955 |